United States Patent Office 3,407,167
Patented Oct. 22, 1968

3,407,167
FURFURYL ALCOHOL RESIN MORTAR COMPOSITION
Roman Slysh, Scotch Plains, N.J., assignor to Esso Research and Engineering Company, a corporation of Delaware
No Drawing. Filed Jan. 26, 1965, Ser. No. 428,226
5 Claims. (Cl. 260—33.6)

ABSTRACT OF THE DISCLOSURE

Mortar compositions containing a furfuryl alcohol resin, an acidic catalyst, a filler, and an extender.

---

This invention is directed to a mortar for bonding structural elements, each to the other. In particular, this invention is directed to a particular mortar which can be used in such small amounts that the mortar lines in a structure are greatly reduced. More particularly, the invention is directed to a particular composition for use as a mortar which comprises furfuryl alcohol resin and aggregate filler material. Most particularly, the invention is directed to a mortar comprising furfuryl alcohol resin, an acidic catalyst, sand, soil and an extender.

The art heretofore has used various compositions and mortars such as Portland cement, sand and mortar for use in bonding structural elements, each to the other. Various special compositions of material have been tried which would include the so-called organic mortars. However, the specialized jobs in which mortas are being used require mortars having particular properties. A number of mortars are presently on the market or are available to the artisan which are separate and distinct each from the other and are useful for various purposes.

The mortars for use in bonding structural elements are tested for effectiveness in various ASTM procedures. Properties which indicate the usefulness or effectiveness of mortars are workability; bond strength, both wet and dry; compressive strength, both wet and dry; the amount of water absorbed; flammability; the thermal stability, that is, the stability of the mortar after being exposed to elevated temperatures of up to 1000° F. for prolonged periods; and resistance to weathering.

There has now been found a highly effective composition for use as a mortar having the properties of increased bond strengths, increased compressive strengths, reduced water absorptiveness, nonflammability, increased thermal stability, and high resistance to weathering. The mortar having such foregoing properties is a furfuryl alcohol resin which contains sand and/or soil, in addition to the resin. There is normally used an acidic catalyst to insure curing of the furfuryl alcohol resin at ambient temperatures. Such catalyst precludes the use of heat during the "setting" of the mortar. In addition to the acidic catalyst, the furfuryl alcohol resin can also contain organic extenders such as chlorinated hydrocarbons and petroleum based plasticizers in order to reduce the cost. The presence of the extenders does not affect the properties of the mortar, including its strength at high temperatures.

The furfuryl alcohol resin mortar cures at ambient temperature to a hard, infusible material. The curing mechanism of the resin is not well understood. However, it may involve cross-linking of units such as,

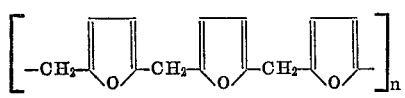

formed by the intermolecular dehydration of furfuryl alcohol. A network of cross-linkages may be formed by addition polymerization involving the nuclear double bonds.

The acidic catalysts which can be used in the practice of this invention include compounds such as p-toluene sulfonic acid, petroleum based sulfonic acids, aniline hydrochloride, sodium bisulfate, a salt of p-toluene sulfonic acid and aniline and other strong inorganic or organic acids.

The extenders which can be used in the practice of this invention include compounds such as chlorinated hydrocarbons, chlorinated waxes, coal tar and petroleum pitches, as well as petroleum plasticizers.

The mortar of this invention is made by mixing furfuryl alcohol resin, acidic catalyst, filler and extender. The material can then be either troweled, brushed or extruded with a caulking gun or other suitable device.

The fillers which can be used in making mortars in accordance with this invention include coke flour, graphite, fly ash, electric furnace fines, cupola slag, sand, soil, mixtures of the foregoing, or any finely divided mineral which is available. Mineral having the following distribution size can be used in the practice of this invention:

Particle size distribution of the soil used

|  | Particle size, mm. |
|---|---|
| 10–15% clay | <0.005 |
| About 20% soil | 0.005–0.05 |
| 65–70% sand | 0.05–2 |

The furfuryl alcohol resin for use in accordance with this invention has properties such as a specific gravity at 77° F./39.2° F. of between about 1.1 to 1.4, preferably having an average specific gravity of about 1.2 to 1.3: viscosity at 77° F. of between about 50 to 350 cps., preferably having an average viscosity of between 100 and 250 cps.; a pH between about 3.5 and 6.5, preferably a pH of 4 to 5; a flash point (Tag Open-Cup) of between about 180° and 210° F., preferably 190° and 200° F.; and a molecular weight of between about 150 and 500, preferably from 200 to 400.

In order to more fully demonstrate the invention, experiments were conducted as set forth in the following examples which are for the purpose of illustration only and are not to be construed as limitations upon the scope of the invention as set forth in the appended claims.

EXAMPLE 1

Three different compositions of furfuryl alcohol resin mortar were prepared and tested by being utilized as the bonding material between two structural elements consisting mainly of sand and asphalt which had been heat cured at about 400° F. The three mortar compositions were prepared as follows:

TABLE I

| Component | Weight Percent | | |
|---|---|---|---|
|  | Mortar A | Mortar B | Mortar C |
| Furfuryl alcohol resin | 34.4 | 20.5 | 22.8 |
| Catalyst D | 3.1 | 8.0 | 8.0 |
| Sand (−20 mesh) | 31.3 | 28.1 | 26.1 |
| Soil | 31.2 | 28.1 | 26.1 |
| Extender A |  | 15.3 |  |
| Extender B |  |  | 17.0 |

The mortar compositions were then used to bond structural elements and tested as to strength. Results are set forth in Table II.

TABLE II

| Test | Motar A | Motar B | Motar C |
|---|---|---|---|
| Bond Strength, p.s.i. (ASTM C-321): | | | |
| Dry | [1] 435 | [1] 405 | [1] 350 |
| Wet | [1] 410 | [1] 230 | [1] 335 |
| Compressive Strength, p.s.i. (ASTM C-306): | | | |
| Dry | 5,800 | 2,600 | 3,900 |
| Wet | 6,500 | 2,800 | 3,950 |
| 7 Day Water Absorption, Wt. percent | 0.3 | 1.0 | 0.5 |
| Flammability (ASTM D-635) | [2] | [2] | [3] |

[1] Failure by briquette bending. Joint remained intact.
[2] Nonburning.
[3] Not tested.

EXAMPLE 2

The A mortar of Example 1 was used to bond two structural elements comprising a mixture of asphalt and sand which had been heat cured at about 400° F. The elements were then hot tested in order to determine the bond and compressive strengths as follows:

TABLE III

Bond strength: P.s.i.
After 15 days in water (tested wet) _____ [1] 261
After 2 hours at—
  150° F. _____ [1] 390
  350° F. _____ [1] 200
After 80 cycles of freeze-thaw [2] _____ [1] 350

[1] Briquette failure (briquettes failed in all cases).
[2] Freeze-thaw test involves freezing the bonded samples in air at 0° F. for 16 hours, followed by thawing in water at room temperature for 8 hours.

Table III and Table IV show the extraordinary durability and heat resistance of furfuryl alcohol resin mortar.

TABLE IV

Hot compressive strength after 2 hours at— P.s.i.
  500° F. _____ 3500
  1000° F. _____ 800

EXAMPLE 3

Another formulation of the claimed mortar was made and tested by utilizing the mortar to bond an asphalt-aggregate structural element. The composition of the mortar was as following.

Mortar B: Wt. Percent

Furfuryl alcohol resin _____ 20.5
Extender A _____ 15.3
Catalyst D _____ 8.0
Sand (−20 mesh) _____ 28.1
Soil _____ 28.1

The bond and compressive strengths of the mortar were found to be very durable and thermally stable as set forth in the following tables.

TABLE V

Bond strength: P.s.i.
After 15 days in water (tested wet) _____ [1] 300
Tested hot after 2 hours at—
  150° F. _____ 307
  350° F. _____ [1] 210

[1] Briquette failure.

TABLE VI

Compressive strength (tested hot) after 2 hours at— P.s.i.
  500° F. _____ 2700
  1000° F. _____ 1100

EXAMPLE 4

Mortars of this invention were compared to the commercially available epoxy-based mortar Threadline R-100. The mortars were used to bond structural elements consisting essentially of heat cured asphalt and sand. The results of the tests are set forth in the table below.

TABLE VII.—PROPERTIES OF ORGANIC-BASED MORTARS

| Mortar | Bond Strength (p.s.i.), Dry/Wet [1] | Compressive Strength (p.s.i.), Dry/Wet [2] | 7 Days Water Absorption, Weight Percent | Thermal Stability [3]—Compressive Strength (p.s.i.) after 2 hrs. at— | |
|---|---|---|---|---|---|
| | | | | 500° F. | 1,000° F. |
| Furfuryl alcohol resin [4] (Mortar A) | >400/>400 | 5,800/6,500 | 0.3 | 3,500 | 800 |
| Threadline R-100 [5] | >400/>400 | 2,300/1,900 | 9 | [6] 860 | 65 |

[1] Determined after 24 hour submersion in water.
[2] Determined after 7 days submersion in water.
[3] Expressed as compressive strength; samples tested hot immediately after heat exposure.
[4] 34.4% furfuryl alcohol resin, 3.0% catalyst D, 31.3% sand (−20 mesh), 31.3% soil.
[5] Commerically available mortar, contains about 52.4% white cement, 28.2 styrene-butadiene emulsion (13% solids), 11.6% epoxy resin, 7.8% a polyamide curing agent.
[6] Subjected at 500° F. for 47 minutes.

EXAMPLE 5

In order to determine the effectiveness of extenders upon the properties of mortars made in accordance with this invention, various compositions of the mortar were made utilizing different organic extenders. The various formulations are set forth in Table VIII.

TABLE VIII.—ADDITIONAL FURFURYL ALCOHOL RESIN MORTAR FORMULATIONS TESTED

| | Weight Percent | | | | | |
|---|---|---|---|---|---|---|
| | Mortar D | Mortar E | Mortar F | Mortar G | Mortar H | Mortar I |
| Furfuryl alcohol resin | 23 | 26 | 23 | 31 | 24 | 23 |
| Extender C | 9 | | | | | |
| Extender D | | 8 | 7 | | | |
| Extender E | | | | | 6 | |
| Extender F | | | | | | 7 |
| Catalyst D | 8 | 6 | 2 | 1 | 2 | 2 |
| Sodium bisulfate | | | 1.5 | 2 | 2 | 2 |
| Sand (−20 mesh) | 30 | | 42.5 | 40 | 42 | 42 |
| Soil | 30 | 60 | 24.0 | 26 | 24 | 24 |

The six mortar formulations described in Table VIII and mortar formulation A of Table I were compared to the best known extrudable mortar formulation Threadline R–100. All the mortars were used to bond structural elements consisting of heat cured asphalt-soil mixtures. The structural elements were then subjected to the standard ASTM tests to provide the results set forth in Table IX.

TABLE IX.—EFFORT OF TEMPERATURE UPON THE BOND STRENGTH OF ORGANIC-BASED MORTARS
[Tested hot after 2 hours at a given temperature]

| Mortar | Bond Strength, p.s.i. | | |
|---|---|---|---|
| | 75° F. | 150° F. | 350° F. |
| A | [1] >400 | [1] >390 | [1] >200 |
| Threadline R-100 | [1] >400 | [1] >400 | 125 |
| D | [1] >370 | 360 | |
| E | [1] >530 | 370 | |
| F | [1] >350 | [1] >300 | |
| G | [1] >360 | [1] >270 | |
| H | [1] >370 | [1] >270 | |
| I | [1] >310 | [1] >180 | |

[1] Briquette failure. Joint remained intact.

EXAMPLE 6

Mortars A and B of Table I and mortars D, E, F, G, H and I of Table IX were tested in order to determine the effect of extenders upon the properties of the furfuryl alcohol resin mortar. Mortar A does not contain, as is to be seen from Table I, an extender. The mortars were used to bond structural elements consisting of heat cured bituminous material and soil. The elements were subjected to the standard ASTM tests to provide the results set forth in Table X. Table X shows that the presence of extenders does not affect materially the properties of the furfuryl alcohol resin mortar. It is to be noted from the data set forth in Table X that the furfuryl alcohol resin mortars have extremely high thermal stability.

Extender C.—A high boiling aromatic with alkyl side chains of ethyl or higher having the following properties: specific gravity 1.046 at 60° F.; flash point (Cleveland Open-Cup) 320° F.; pour point —20° F.; refractive index at 20° C. about 1.6.

Extender D.—Aromatic by-product of lube oil manufacture having the following properties: specific gravity 20° C. about 0.95; refractive index 20° C. 1.533; viscosity SSU at 100° F. 117; flash point (Cleveland Closed-Cup) 340° F.

Extender E.—An oil containing about 70% naphthenes and the rest aromatics having the following properties: specific gravity at 20° C. of about 0.865; refractive index at 20° C. of about 1.4899; a viscosity SSU at 100° F. 58; flash point (Cleveland Closed-Cup) 300° F.

Extender F.—An aromatic oil having the following properties: API gravity at 60° F. 15.2; specific gravity at 60° F. 0.9646; viscosity SSU at 100° F. 130 and at 210° F. 38.7; aniline point 88; pour point —25° F.; flash point (Cleveland Open-Cup) 320° F.; refractive index at 20° C. 1.5330; density 8.033 lbs./gal. at 25° C. A satisfactory mortar composition comprises 5 to 50 wt. percent furfuryl alcohol resin, 0.5 to 12 wt. percent acidic catalyst, 40 to 90 wt. percent filler and 0 to 50 wt. percent extender wherein the weight percents of each of the components comprise the total weight percent of the mortar.

What is claimed is:

1. A mortar composition comprising 20.5 wt. percent furfuryl alcohol resin, 8.0 wt. percent aniline p-toluene sulfonic acid salt, 28.1 wt. percent —20 mesh sand, 28.1 wt. percent soil and 15.3 wt. percent of a chlorinated polyphenyl extender having the following properties: contains 48% chlorine; acidity mg. KOH/g. 0.010; specific gravity 1.405 at 65° C.; density 12.04 lbs./gal. at 25° C.; distillation range corrected 644° to 700° F.; flash point (Cleveland Open-Cup) 379° to 384° F.; pour point TABLE X.—EFFECT OF ORGANIC EXTENDERS UPON THE PROPERTIES OF FURFURYL ALCOHOL RESIN MORTAR

| Mortar [6] | Bond Strength (p.s.i.), Dry/Wet | Compressive Strength (p.s.i.), Dry/Wet | 7 Days Water Absorption, Weight percent | Thermal Stability [1]— Compressive Strength, p.s.i. after 2 hours at— | |
|---|---|---|---|---|---|
| | | | | 500° F. | 1,000° F. |
| A [2] | >400/>400 | 5,800/6,500 | 0.3 | 3,500 | 800 |
| B [3] | >400/>300 | 2,600/2,800 | 1.0 | 2,700 | 1,100 |
| D [4] | >370/>350 | 3,200/3,500 | 1.0 | [5] 3,900 | 880 |
| E | >530/>500 | 5,600/6,300 | 0.6 | | 2,200 |
| F | >350/>300 | 6,300/6,700 | 0.3 | | 700 |
| G | >360/>350 | 4,300/4,900 | 0.5 | | 600 |
| H | >370/>310 | 6,900/7,100 | 0.1 | | 1,000 |
| I | >310/>350 | 7,300/7,100 | | | 1,280 |

[1] Expressed as compressive strength; samples tested hot immediately after heat exposure.
[2] Mortar contains 34.4% furfuryl alcohol resin, 3.0% catalyst D, 31.3% sand (—20 mesh), 31.3% soil.
[3] Mortar contains 20.5% furfuryl alcohol resin, 8.0% catalyst D, 15.3% extender A, 28.1% sand, 28.1% soil.
[4] A petroleum-based plasticizer; mortar contains 23.0% furfuryl alcohol resin, 8.0% catalyst D, 9.0% extender C, 30% sand, 30% soil.
[5] Subjected at 500° F. for 90 minutes.
[6] All these mortars are nonburning as determined by ASTM D-635.

In the foregoing examples, the compositions of the various extenders and catalysts are as follows:

Catalyst D.—A salt of aniline and p-toluene sulfonic acid.

Extender A.—A chlorinated polyphenyl having the following properties: contains 48% chlorine; acidity mg. KOH/g. 0.010; specific gravity 1.405 at 65° C.; density 12.04 lbs./gal. at 25° C.; distillation range corrected 644° to 700° F.; flash point (Cleveland Open-Cup) 379° to 384° F.; pour point (ASTM E-97) 19.4° F.; refractive index ($n_D^{20}$) 1.630 to 1.631.

Extender B.—A chlorinated polyphenyl having the following properties: contains 54% chlorine; acidity mg. KOH/g. 0.010; specific gravity 1.495 at 65° C.; density 12.82 lbs./gal. at 25° C.; distillation range corrected 365° to 390° C.; flash point (Cleveland Open-Cup)—no flash up to boiling point; pour point (ASTM E-97) 50° F.; refractive index ($n_D^{20}$) 1.639 to 1.641.

(ASTM E-97) 19.4° F.; refractive index ($n_D^{20}$) 1.630 to 1.631.

2. A mortar consisting essentially of 22.8 wt. percent furfuryl alcohol resin, 8.0 wt. percent of a salt of aniline and p-toluene sulfonic acid, 26.1 wt. percent —20 mesh sand, 26.1 wt. percent soil and 17.0 wt. percent of a chlorinated polyphenyl extender having the following properties: contains 54% chlorine; acidity mg. KOH/g. 0.010; specific gravity 1.495 at 65° C.; density 12.82 lbs./gal. at 25° C.; distillation range corrected 365° to 390° C.; flash point (Cleveland Open-Cup)—no flash up to boiling point; pour point (ASTM E-97) 50° F.; refractive index ($n_D^{20}$) 1.639 to 1.641.

3. A mortar consisting essentially of 23 wt. percent furfuryl alcohol resin, 9 wt. percent of a high boiling aromatic extender with alkyl side chains of ethyl or higher having the following properties: specific gravity 1.046 at 60° F.; flash point (Cleveland Open-Cup) 320° F.; pour point —20° F.; refractive index at 20° C. about 1.6, 8 wt. percent of a salt of aniline and p-toluene sulfonic acid catalyst, 30 wt. percent —20 mesh sand, and 30 wt. percent soil.

4. A mortar consisting essentially of 24 wt. percent furfuryl alcohol resin, 6 wt. percent of an oil extender containing about 70% naphthenes and the rest aromatics having the following properties: specific gravity at 20° C. of about 0.865; refractive index at 20° C. of about 1.4899; a viscosity SSU at 100° F. 58; flash point (Cleveland Closed-Cup) 300° F., 2 wt. percent of a salt of aniline and p-toluene sulfonic acid catalyst, 2 wt. percent sodium bisulfate, 42 wt. percent —20 mesh sand and 24 wt. percent soil.

5. A mortar consisting essentially of 23 wt. percent furfuryl alcohol resin, 7 wt. percent of an aromatic oil extender having the following properties: API gravity at 60° F. 15.2; specific gravity at 60° F. 0.9646; viscosity SSU at 100° F. 130 and at 210° F. 38.7; aniline point 88; pour point —25° F.; flash point (Cleveland Open-Cup) 320° F.; refractive index at 20° C. 1.5330; density 8.033 lbs./gal. at 25° C., 2 wt. percent of a salt of aniline and p-toluene sulfonic acid catalyst, 2 wt. percent sodium bisulfate, 42 wt. percent —20 mesh sand and 24 wt. percent soil.

References Cited
UNITED STATES PATENTS

| | | | |
|---|---|---|---|
| 2,300,812 | 11/1942 | Rust | 260—41 |
| 2,345,966 | 4/1944 | Fiedler et al. | 260—88.5 |
| 2,499,275 | 2/1950 | McWhorter | 260—88.5 |
| 2,653,920 | 9/1953 | Harford | 260—88.5 |
| 2,768,408 | 10/1956 | Strigle | 260—88.5 |
| 2,948,639 | 8/1960 | Price | 260—41 |
| 3,107,153 | 10/1963 | Boquist | 260—28 |
| 3,168,494 | 2/1965 | Metil | 260—41 |
| 3,301,278 | 1/1967 | Lander et al. | 260—88.5 |

MORRIS LIEBMAN, *Primary Examiner.*

B. A. AMERNICK, *Assistant Examiner.*